United States Patent
Lessard et al.

(10) Patent No.: US 6,194,473 B1
(45) Date of Patent: Feb. 27, 2001

(54) CHEMICAL DISPERSANT FOR OIL SPILLS (LAW898)

(75) Inventors: Richard Raymond Lessard, East Stroudsburg, PA (US); Kenneth William Becker, Houston, TX (US); Gerard Paul Canevari, Cranford, NJ (US); Anita George-Ares, Staten Island, NY (US); Robert John Fiocco, Summit, NJ (US)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/461,438

(22) Filed: Dec. 14, 1999

(51) Int. Cl.[7] .............. B01F 17/10; B01F 17/34; B01F 17/42; C09K 3/32
(52) U.S. Cl. ............... 516/63; 210/925; 510/365
(58) Field of Search ............... 516/63; 210/925; 510/365

(56) References Cited

U.S. PATENT DOCUMENTS

| | | | | |
|---|---|---|---|---|
| 2,121,616 | * | 6/1938 | Werntz | 516/63 X |
| 2,176,423 | * | 10/1939 | Jaeger | 516/63 X |
| 3,609,096 | * | 9/1971 | Salomone | 510/365 X |
| 4,502,962 | * | 3/1985 | Becker et al. | 516/63 X |
| 4,830,759 | * | 5/1989 | Charlier | 516/63 X |
| 5,523,013 | * | 6/1996 | Durbut et al. | 516/63 X |
| 5,618,468 | | 4/1997 | Canevari et al. | 252/354 |
| 5,728,320 | | 3/1998 | Fiocco et al. | 252/312 |

* cited by examiner

Primary Examiner—Richard D. Lovering
(74) Attorney, Agent, or Firm—Charles J. Brumlik

(57) ABSTRACT

A formulation of chemical surfactants, solvents and inorganic salts is effective for dispersing heavy oils in both salt and fresh water. The formulation comprises a mixture of a sorbitan ester of an aliphatic monocarboxylic acid, a polyoxyethylene adduct of a sorbitan monoester of an aliphatic monocarboxylic acid, an alkali metal salt of a dialkyl sulfosuccinate, a polyoxyethylene adduct of a sorbitan triester of a monocarboxylic acid, a solvent comprising a hydrocarbon and/or a glycol ether and an inorganic salt containing a soluble divalent cation such as calcium or magnesium.

13 Claims, No Drawings

CHEMICAL DISPERSANT FOR OIL SPILLS (LAW898)

BACKGROUND OF THE INVENTION

1. Field of the Invention

This invention relates to an oil dispersant formulation and a process for dispersing spilled oil on water. More particularly, a formulation of chemical surfactants and inorganic salts results in a low toxicity dispersant which is effective at dispersing highly viscous oil at low concentrations in both salt and fresh water.

2. Description of the Related Art

One of the technologies used for oil spill response involves the use of chemical dispersants. The application of chemical dispersants is dependent on several factors: (1) weather conditions, (2) nature of the oil spilled, (3) area to be covered, (4) salinity of the water to be treated and (5) adequacy of equipment and supplies. Although it is highly desirable, it has not been possible to provide a single chemical dispersant formulation which will treat all oils under all conditions. For example, it is much more difficult to disperse a high-boiling viscous oil such a bunker oil as compared to a light crude oil. Furthermore, dispersant products which are effective in salt water often are substantially ineffective in fresh water.

A desirable property for chemical dispersants used to treat oil spills is that the surfactant formulation of the dispersant results in very low oil-water interfacial tension such that the oil is effectively dispersed as fine oil droplets in water without coalescing even at low dispersant to oil ratios. Also, the dispersant formulation should be of minimal toxicity so that it does not add to the environmental damage caused by the oil spill.

Various dispersant formulations have been advanced for treating oil spills. U.S. Pat. Nos. 5,618,468 and 5,728,320 disclose dispersant products which are highly effective for dispersing oil spills in salt water. In low salinity water, however, these dispersant products lose effectiveness and become ineffective in fresh water.

SUMMARY OF THE INVENTION

The present invention provides an improved dispersant formulation which is effective for dispersing spilled oil in both salt and fresh water.

The dispersant formulation comprises:

(a) a sorbitan monoester of a $C_{10}$–$C_{20}$ aliphatic monocarboxylic acid;

(b) a polyoxyethylene adduct of a sorbitan monoester of a $C_{10}$–$C_{20}$ aliphatic monocarboxylic acid, said adduct having from 6 to 30 ethyleneoxide units per mole of ester;

(c) an alkali metal salt of a dialkyl sulfosuccinate wherein the alkyl group is a branched chain radical containing 4 to 13 carbon atoms;

(d) a polyoxyethylene adduct of a sorbitan triester of a $C_{10}$–$C_{20}$ aliphatic monocarboxylic acid having from 6 to 30 ethyleneoxide units per mole of triester or a polyoxyethylene adduct of a sorbitol hexaester of $C_{10}$–$C_{20}$ aliphatic monocarboxylic acid, said having from 6 to 30 ethyleneoxide units per mole of hexaester;

(e) a glycol ether solvent selected from the group consisting of ethylene glycol ether, propylene glycol ether, dipropylene glycol ether and tripropylene glycol n-butyl ether; and (f) an inorganic salt.

In another embodiment, the dispersant formulation comprises:

(a) a sorbitan monoester of a $C_{10}$–$C_{20}$ aliphatic monocarboxylic acid;

(b) a polyoxyethylene adduct of a sorbitan monoester of a $C_{10}$–$C_{20}$ aliphatic monocarboxylic acid, said adduct having from 6 to 30 ethyleneoxide units per mole of ester;

(c) an alkali salt of a dialkyl sulfosuccinate wherein the alkyl group is a branched chain radical containing 4 to 13 carbon atoms provided that the critical micelle concentration at 25° C. is greater than 0.05 g/100 ml;

(d) a polyoxyethylene adduct of a sorbitan triester of a $C_{10}$–$C_{20}$ aliphatic monocarboxylic acid having from 6 to 30 ethyleneoxide units per mole of triester or a polyoxyethylene adduct of a sorbitol hexaester of $C_{10}$–$C_{20}$ aliphatic monocarboxylic acid, said having from 6 to 30 ethyleneoxide units per mole of hexaester;

(e) a solvent comprising a paraffinic hydrocarbon and a glycol ether selected from the group consisting of ethylene glycol ether, propylene glycol ether, dipropylene glycol ether and tripropylene glycol ether.

(f) an inorganic salt containing a soluble divalent cation.

It has been found that the inorganic salts enhance the effectiveness of the dispersant formulation in fresh or low salinity water by reducing the tendency of low salinity water to extract surfactants before they can be effective in oil.

The improved process for dispersing an oil layer on water comprises contacting the oil layer on the water surface with the dispersant formulation described above.

DESCRIPTION OF THE PREFERRED EMBODIMENTS

In the sorbitan esters of $C_{10}$–$C_{20}$ aliphatic monocarboxylic acids (component (a)), the aliphatic radical is straight or branched chain and saturated or unsaturated. Preferred aliphatic monocarboxylic acids moieties are $C_{12}$–$C_{18}$ straight chain saturated or monoethylenically unsaturated. Sorbitan esters are prepared by dehydrating sorbitol followed by reaction with aliphatic monocarboxylic acid, and are available commercially from ICI under the trade name Span®.

Polyoxyethylene adducts of sorbitan monoesters of $C_{10}$–$C_{20}$ aliphatic monocarboxylic acids (component (b)) have from 6 to 30, preferably 15 to 22 ethyleneoxide units per mole of ester. Such polyoxyethylene adducts are prepared by reacting the sorbitan esters of aliphatic monocarboxylic acids described above with 1.2-ethylene oxide. These polyoxyethylene adducts are available commercially from ICI Inc. under the trade name Tween®.

The alkali metal salt of a dialkyl sulfosuccinate wherein the alkyl group is a $C_4$–$C_{13}$ branched chain radical (component (c)) is an anionic surfactant. A preferred salt is sodium dioctyl sulfosuccinate commercially available from Mona Industries, Inc. under the trade name Monowet®. The critical micelle concentration for any given dialkyl sulfosuccinate is primarily a function of nature of the alkyl group on the sulfosuccinate. In the present dispersant formulation, the dialkyl sulfosuccinate surfactant has a critical micelle concentration at 25° C. of at least about 0.05 g/100 ml.

Polyoxyethylene adducts of sorbitan triesters or sorbitol hexaesters of $C_{10}$–$C_{20}$ aliphatic monocarboxylic acids (component (d)) contain from 6 to 30, preferably 15 to 22 ethyleneoxide units per mole of triester or hexaester. The sorbitol adduct is prepared by reacting ethylene oxide with sorbitol followed by esterification and are commercially available.

The propylene or ethylene glycol ethers used as solvents in the present invention (component (e)) have a maximum solubility in water of 25 ml per 100 ml water at 25° C., preferably 10 ml per 100 ml water. Preferred solvents are dipropylene glycol n-butyl ether, propylene glycol n-butyl ether, tripropylene glycol n-butyl ether, propylene glycol phenyl ether and ethylene glycol phenyl ether, more preferably ethylene glycol n-butyl ether, propylene glycol n-butyl ether, dipropylene glycol n-butyl ether, and tripropylene glycol n-butyl ether, especially dipropylene glycol n-butyl ether. Glycol ethers are available commercially from Dow Chemical Co. under the trade name Dowanol®. Propylene and ethylene glycol monoethers possess favorable lipophilic properties for use in oil dispersant formulations and are also of low toxicity. From a toxicological standpoint, ethers which do not contain an aromatic moiety are preferred.

When the propylene or ethylene glycol ether solvents are combined with a paraffinic solvent, the solubility of the glycol ether solvents is of less importance, especially where the paraffinic solvent is the major component of the solvent package. It is feasible to use the propylene glycol ether or ethylene glycol ether with water, alcohol or glycol. Preferred paraffinic solvents are isoparaffinic solvents. Especially preferred are isoparaffinic solvents containing at least about 50 vol. % of isoparaffins. Such isoparaffinic solvents are available from Exxon Company, U.S.A. under the trade name ISOPAR®. The total amount of solvent is from 15 to 90 vol. % based on dispersant formulation, preferably from 30 to 80 vol. %. The amount of paraffinic solvent is from about 30 to 100 vol. % based on total solvent, preferably from 60–98 vol. %. Preferred solvent combinations include isoparaffinic solvent combined with ethylene glycol n-butyl ether, propylene glycol n-butyl ether, dipropylene glycol n-butyl ether and tripropylene glycol n-butyl ether, tripropylene glycol methyl ether, propylene glycol phenyl ether and propylene glycol n-propyl ether. Especially preferred solvent combinations include isoparaffinic solvent combined with dipropylene glycol n-butyl ether. While not wishing to be bound to any theory, it is believed that when any given solvent set forth above, e.g., glycol ether, water, alcohol or glycol, is combined with paraffinic solvent, especially isoparaffinic solvent, the nature of the given solvent is not as important as when the given solvent is the sole solvent (without added paraffinic solvent). When combined with isoparaffinic solvent, the role of the given solvent relates to the solubility and hence stability of the surfactant package as well as impacting performance of the dispersant formulation in terms of its dispersant effectiveness. In some applications, it may be feasible to use a paraffinic hydrocarbon as the sole solvent component, especially when the parafinic solvent is an isoparaffins. A preferred isoparaffinic solvent is one containing at least 50 wt. % isoparaffins.

The inorganic salt of the dispersant formulations improves the effectiveness of the dispersant formulations in fresh or low salinity water by reducing the tendency of low salinity water to extract surfactants before they can be effective on oil. By providing the inorganic salt in the surfactant formulation, the formulation becomes less soluble in fresh water thereby retaining its effectiveness. The inorganic salt preferably contains soluble divalent cations, such as calcium, magnesium, iron (ferrous) and the like. Calcium and magnesium cations are preferred. The salts may be in the form of chlorides, carbonates, sulfates, nitrates, phosphates and the like.

The concentration ranges for components (a) through (e) in the dispersant formulation are as follows: (a) 1–9 volume (vol.) %; (b) 2–17 vol. %; (c) 5–34 vol. %; (d) 2–25 vol. %; and (e) 90–15 vol. %, based on the total volume of the dispersant formulation. Where component (e) is a combination of solvents, the total solvent remains at 90–15 vol. %, preferably 30 to 80 vol. %. The inorganic salt may be present at concentrations ranging from 0.1 to 10.0 weight (wt.) % based on the total weight of the dispersant formulation. Preferably the salt contains a divalent cation where the cation is present at a level of 0.5 to 2.0 wt.% based on the total weight of the dispersant formulation.

The present dispersant formulations containing propylene or ethylene glycol ethers have the advantage of dispersing highly viscous hydrocarbons, i.e., hydrocarbons having a viscosity greater than 10,000 cp at 15° C. Such viscous hydrocarbons such as heavy crudes, weathered crudes and bunker oil are difficult to disperse because of the cohesiveness of the oil which resists the spreading and breakup of the oil as well as the penetration mixing of the dispersant formulation. In addition these formulations have low environmental impacts and can be sprayed over wide temperature ranges. Viscosity properties are favorable to aerial spraying over a wide temperature range, and evaporation losses are minimal which means that nearly all the solvent will reach the oil slick to aid surfactant penetration of the oil. It is preferred that the viscosities for the dispersant formulations be greater than about 70 cp at 68° F. Oil slick dispersal can be achieved by spraying the dispersant formulation directly on the slick through one or more spray nozzles. Dispersal action can be achieved under normal water motion, i.e., in a presence of wave action.

An important property of a dispersant formulation for use on oil spills is the ability to disperse the maximum amount of oil per unit of dispersant. The ability to effectively disperse oil at low dispersant to oil ratios (DOR) provides both economic and environmental benefit. By lowering the amount of dispersant per unit of oil, there is less need for resupplying the application system thereby saving time. The present formulations are effective at low dispersant to oil ratios.

EXAMPLE

The following demonstrates the freshwater effectiveness of the dispersant formulation of the invention.

A dispersant formulation prepared by mixing 6.4 vol. % of sorbitan monooleate, 11.7 vol. % ethoxylated (20) sorbitan monooleate, 25.0 vol. % sodium dioctyl sulfosuccinate, 18.1 vol. % of ethoxylated (20) sorbitan trioleate and 38.8 vol. % of dipropylene glycol n-butyl ether as solvent. This dispersant is highly effective for dispersing oil in salt water but is substantially ineffective for dispersing oil in fresh water. It contains the ingredients of the invention except for the absence of an inorganic salt.

Small amounts of calcium chloride were added to the above dispersant formulation to determine the ability of the salt to improve dispersant performance in fresh water.

Dispersant performance was evaluated in the Dispersant Effectiveness Test which was first published in a paper entitled "A New Laboratory Method for Evaluating Oil Spill Dispersants" and presented at the 1993 International Oil Spill Conference. In the Test, four 250 ml separatory funnels are clamped to a standard Burrell laboratory Wrist-action shaker. The separatory funnels are filled with approximately 250 ml of water, and test oil is added to each. Crude oil is premixed with dispersant at the desired dispersant/oil ratio (DOR).

The funnels are shaken on the Wrist action shaker for 15 minutes to disperse the oil in water. While still shaking, sorbent pads are added to the water surface, and shaking is continued for an additional 5 minutes. The water is drained and the dispersed oil is extracted from the water with solvent. The non-dispersed oil remaining in the funnel and on the pad is then extracted separately.

The oil content of the two extracts is determined using a spectrophotometer at an appropriate wave-length setting, e.g., 460 millimicrons. The extracts are diluted to obtain a reading in the linear range, e.g., 0.1 to 1.1. The ratio of dispersed oil to dispersed plus undispersed oil is determined based on the dilution and absorbance measurement of each extract. The procedure is repeated for each pair of extracts, and the percent dispersed oil calculated for each. The average and standard deviation for the four data points (or more, if desired) are then calculated.

The following data for the aforedescribed dispersant formulation were obtained in the Dispersant Effectiveness Test using a DOR of 1:20, i.e., one volume part dispersant to twenty volume parts oil.

TABLE

| Wt. % Calcium[1] | Oil | Water | % Oil Dispersed |
| --- | --- | --- | --- |
| 0.0 | ANS[2] | DI[4] | 22 |
| 0.2 | ANS | DI | 29 |
| 0.35 | ANS | DI | 42 |
| 0.7 | ANS | DI | 43 |
| 1.0 | ANS | DI | 63 |
| 0.0 | Hydra[3] | Rio de la Plata[5] | 49 |
| 1.0 | Hydra | Rio de la Plata | 70 |
| 0.0 | Hydra | DI | 33 |
| 1.0 | Hydra | DI | 58 |
| 0.0 | Canadon Seco[3] | DI | 10 |
| 1.0 | Canadon Seco | DI | 43 |

[1]Based on total weight of dispersant formulation
[2]Alaska North Slope Crude
[3]Argentinean crudes
[4]De-ionized water
[5]River water from Argentina The above data show that the addition of a salt containing a soluble divalent cation significantly improves the dispersant's ability to disperse oil in fresh water.

What is claimed is:

1. An improved dispersant formulation which is effective in water having a wide range of salinity, which comprises:
   (a) a sorbitan monoester of a $C_{10}$–$C_{20}$ aliphatic monocarboxylic acid;
   (b) a polyoxyethylene adduct of a sorbitan monoester of a $C_{10}$–$C_{20}$ aliphatic monocarboxylic acid, said adduct having from 6 to 30 ethyleneoxide units per mole of ester;
   (c) an alkali metal salt of a dialkyl sulfosuccinate wherein the alkyl group is a branched chain radical containing 4 to 13 carbon atoms;
   (d) a polyoxyethylene adduct of a sorbitan triester of a $C_{10}$–$C_{20}$ aliphatic monocarboxylic acid having from 6 to 30 ethyleneoxide units per mole of triester or a polyoxyethylene adduct of a sorbitol hexaester of $C_{10}$–$C_{20}$ aliphatic monocarboxylic acid, said having from 6 to 30 ethyleneoxide units per mole of hexaester;
   (e) a glycol ether solvent selected from the group consisting of ethylene glycol ether, propylene glycol ether, dipropylene glycol ether, tripropylene glycol ether and mixtures thereof; and
   (f) a divalent inorganic salt.

2. The dispersant formulation of claim 1 wherein the cation of component (f) is calcium or magnesium.

3. The dispersant formulation of claim 2 wherein component (e) is selected from the group consisting of ethylene glycol n-butyl ether, propylene glycol n-butyl ether, dipropylene glycol n-butyl ether, tripropylene glycol n-butyl ether and mixtures thereof.

4. The dispersant formulation of claim 3 wherein component (f) comprises calcium chloride.

5. A method for dispersing an oil layer on water which comprises contacting the layer with the dispersant formulation of claim 1.

6. An improved dispersant formulation which is effective in water having a wide range of salinity, which comprises:
   (a) a sorbitan monoester of a $C_{10}$–$C_{20}$ aliphatic monocarboxylic acid;
   (b) a polyoxyethylene adduct of a sorbitan monoester of a $C_{10}$–$C_{20}$ aliphatic monocarboxylic acid, said adduct having from 6 to 30 ethyleneoxide units per mole of ester;
   (c) an alkali salt of a dialkyl sulfosuccinate wherein the alkyl group is a branched chain radical containing 4 to 13 carbon atoms provided that the critical micelle concentration at 25° C. is greater than 0.05 g/100 ml;
   (d) a polyoxyethylene adduct of a sorbitan triester of a $C_{10}$–$C_{20}$ aliphatic monocarboxylic acid having from 6 to 30 ethyleneoxide units per mole of triester or a polyoxyethylene adduct of a sorbitol hexaester of $C_{10}$–$C_{20}$ aliphatic monocarboxylic acid, said having from 6 to 30 ethyleneoxide units per mole of hexaester;
   (e) a solvent comprising a hydrocarbon and a glycol ether selected from the group consisting of ethylene glycol ether, propylene glycol ether, dipropylene glycol ether and tripropylene glycol ether; and
   (f) an inorganic salt containing a soluble divalent cation.

7. The dispersant formulation of claim 6 wherein component (e) is selected from the group consisting of ethylene glycol n-butyl ether, propylene glycol n-butyl ether, dipropylene glycol n-butyl ether, tripropylene glycol n-butyl ether and mixtures thereof.

8. The dispersant of claim 7 wherein the hydrocarbon solvent component comprises an isoparaffinic hydrocarbon.

9. The dispersant of claim 8 wherein the divalent cation of component (f) is calcium or magnesium.

10. The dispersant of claim 9 wherein component (f) comprises calcium chloride.

11. A method for dispersing an oil layer on water which comprises contacting the layer with the dispersant formulation of claim 6.

12. The method of claim 11 wherein the dispersant formulation is applied to the oil layer by aerial spraying.

13. The method of claim 12 wherein component (f) of the dispersant formulation comprises a calcium salt.

* * * * *